(12) United States Patent
Goodwin et al.

(10) Patent No.: US 7,513,993 B2
(45) Date of Patent: Apr. 7, 2009

(54) FILTER DEVICES INCLUDING A POROUS BODY

(75) Inventors: Timothy Michael Goodwin, Pittsboro, NC (US); Christopher R. Yahnker, Raleigh, NC (US); Robert Frank Swindell, Sanford, NC (US); Bret Schaller, Sanford, NC (US); Arthur J. Bromley, Ocklawaha, FL (US); Shirley A. Bromley, legal representative, Ocklawaha, FL (US)

(73) Assignee: Pentair Water Pool and Spa, Inc., Sanford, NC (US)

( * ) Notice: Subject to any disclaimer, the term of this patent is extended or adjusted under 35 U.S.C. 154(b) by 0 days.

(21) Appl. No.: 11/229,144

(22) Filed: Sep. 16, 2005
(Under 37 CFR 1.47)

(65) Prior Publication Data

US 2006/0124527 A1    Jun. 15, 2006

Related U.S. Application Data (60) Provisional application No. 60/611,462, filed on Sep. 20, 2004.

(51) Int. Cl.
*B01D 24/42* (2006.01)
(52) U.S. Cl. .................. 210/167.13; 210/289; 210/291; 210/497.01; 210/510.1
(58) Field of Classification Search ............ 210/167.12, 210/167.13, 289, 291, 510.1, 457, 495, 497.01
See application file for complete search history.

(56) References Cited

U.S. PATENT DOCUMENTS

| | | | |
|---|---|---|---|
| 2,297,248 A * | 9/1942 | Rudolph .................. 210/510.1 |
| 3,554,377 A | 1/1971 | Miller ........................ 210/275 |
| 3,625,365 A | 12/1971 | Armstrong et al. .......... 210/232 |
| 3,685,657 A * | 8/1972 | Hunter et al. ............... 210/289 |
| 3,747,768 A | 7/1973 | Barrera ....................... 210/288 |
| 3,770,127 A | 11/1973 | White ......................... 210/136 |
| 3,798,104 A * | 3/1974 | Mallonee ................. 210/510.1 |
| 3,826,375 A * | 7/1974 | Fournier ..................... 210/291 |
| 3,984,327 A | 10/1976 | May ........................... 210/284 |
| 4,094,790 A * | 6/1978 | Schmidt, Jr. ................ 210/289 |
| 4,098,695 A * | 7/1978 | Novotny ...................... 210/85 |
| 4,169,793 A | 10/1979 | Lockshaw .............. 210/167.13 |
| 4,200,536 A | 4/1980 | Kaufman .................... 210/279 |
| 4,218,324 A * | 8/1980 | Hartmann et al. ........... 210/457 |
| 4,379,750 A | 4/1983 | Tiggelbeck ................. 210/232 |
| 4,441,997 A | 4/1984 | Fields ........................ 210/266 |
| 4,478,716 A | 10/1984 | Hasegawa et al. ........... 210/289 |
| 4,657,673 A | 4/1987 | Kessler ....................... 210/108 |
| 4,753,726 A | 6/1988 | Suchanek ................... 210/232 |
| 4,882,053 A * | 11/1989 | Ferri ....................... 210/510.1 |
| 5,068,033 A | 11/1991 | Tobias et al. ........... 210/167.12 |
| 5,088,554 A * | 2/1992 | Arterbury et al. ........ 210/510.1 |
| 5,554,281 A | 9/1996 | McDougald ................ 210/273 |
| 5,656,166 A * | 8/1997 | Linnersten et al. ....... 210/510.1 |

(Continued)

*Primary Examiner*—Christopher Upton
(74) *Attorney, Agent, or Firm*—Greenberg Traurig, LLP (57) ABSTRACT

Fluid filter devices include at least one porous body. In one example, the fluid filter device can be incorporated as part of a fluid filter apparatus. The fluid filter apparatus can include a container defining an interior area wherein the filter device is positioned within the interior area. Particulate can be positioned within the interior area to cover the porous body to enhance the filter capabilities of the fluid filter apparatus.

14 Claims, 7 Drawing Sheets

U.S. PATENT DOCUMENTS

| | | | |
|---|---|---|---|
| 6,105,787 A * | 8/2000 | Malkin | 210/457 |
| 6,325,931 B1 | 12/2001 | Roberts et al. | 210/293 |
| 6,605,211 B1 | 8/2003 | Slopack | 210/167.12 |
| 6,615,990 B1 * | 9/2003 | Jokschas et al. | 210/457 |
| 6,695,966 B1 * | 2/2004 | Sakraschinsky et al. | 210/497.01 |
| 6,811,694 B2 * | 11/2004 | Jainek | 210/457 |
| 2004/0094464 A1 * | 5/2004 | Baumann et al. | 210/497.01 |

\* cited by examiner

FILTER DEVICES INCLUDING A POROUS BODY

CROSS-REFERENCE TO RELATED APPLICATION

The present invention claims the benefit of U.S. Provisional Application No. 60/611,462 filed Sep. 20, 2004, the entire disclosure which is herein incorporated by reference.

FIELD OF THE INVENTION

The present invention relates to filter devices, and more particularly, to filter devices including a porous body.

BACKGROUND OF THE INVENTION

Many bodies of liquid, such as swimming pools, commonly include sand filters to provide a sanitary and pleasing aquatic environment. Known sand filters include a plurality of slotted laterals buried beneath a volume of sand. A pump circulates pool water through a volume of sand and through slots in the laterals for reintroduction into the swimming pool environment. The volume of sand functions to filter particulate while the slots in the laterals permit passage of water while inhibiting passage of sand through the lateral. However, known slotted laterals may leak a certain amount of sand and other debris not filtered by the sand. Moreover, areas of the lateral between the slots may be vulnerable to damage. If damaged, the slotted laterals can allow further significant leakage of sand through the damaged portions of the lateral. Leaked sand can be transferred to the bottom of the swimming pool as entrained sand is blown into the swimming pool with the return water stream. Periodically, maintenance may be required to clean the bottom of the swimming pool to remove accumulated sand leaked by the sand filter.

SUMMARY OF THE INVENTION

Accordingly, it is an aspect of the present invention to obviate problems and shortcomings of conventional filter devices.

In accordance with one aspect, a fluid filter apparatus comprises a container defining an interior area. The fluid filter apparatus further includes a filter device positioned within the interior area of the container. The filter device comprises at least one porous body. The fluid filter apparatus further includes particulate positioned within the interior area and covering the porous body.

In accordance with another aspect, a fluid filter apparatus comprises a filter device including a hub and a plurality of porous bodies configured to be attached to the hub such that the plurality of porous bodies are radially disposed about the hub.

In accordance with still another aspect, a filter device comprises at least one porous body with a sleeve. The filter device further includes a frame at least partially positioned within an interior area of the sleeve. The frame is configured to facilitate maintenance of a sleeve shape and is provided with a coupling configured to removably attach the frame with respect to a base.

It is to be appreciated that other, different, possibly more broad aspects may be provided as further aspects of the present invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF EXAMPLE EMBODIMENTS

Certain terminology is used herein for convenience only and is not to be taken as a limitation on the present invention. Further, in the drawings, the same reference numerals are employed for designating the same elements.

Filter devices herein may be used to facilitate filtration of many bodies of liquid, such as swimming pools, spas and/or other bodies of liquid. In one application, filter devices may be used to remove contaminants, such as debris, from the aquatic environment of a swimming pool.

Filter devices can comprise a wide range components to facilitate a filter function. For instance, as shown, a filter device 30 in accordance with aspects of the present invention can be provided with at least one porous body 50. Porous bodies may be configured to filter debris having a wide range of sizes. For example, porous bodies may even be configured to filter debris having a maximum outer dimension of less than 10 microns. In further examples, porous bodies may be configured to filter debris having a maximum outer dimension of about 2 microns. In further examples, porous bodies may be configured to filter debris having a maximum outer dimension from about 2 microns to less than 10 microns. It is further contemplated the porous bodies may be configured to filter debris having other maximum dimensions, such as less than 2 microns or greater than 10 microns.

Porous bodies can include a body with a plurality of pores disbursed throughout a thickness of the porous body. At least a plurality of the pores along the thickness of the body are in fluid communication with one another such that fluid may travel through the thickness of the porous body. In one example, the porous body can comprise an open-cell porous structure that allows fluid communication between a plurality of cells. Moreover, disbursement of the pores throughout the thickness of the porous body can provide a tortuous path throughout a thickness of the porous body. Providing a tortuous path can help snare debris that might not otherwise be filtered by a similarly sized aperture extending substantially along a straight line through the thickness of a filter body. Accordingly, the porous body may be configured to filter various sizes of debris by the porous nature of the body, such as the pore size and/or the tortuous path created by the pores communicating with one another within the porous body.

The pore size throughout the material may be constant or vary depending on the location along a length of the porous body and/or the depth from the exterior surface of the porous body. For example, a porous body may be provided with a larger or smaller pore size along a length of the porous body and/or along a thickness of the porous body. For instance, the porous body can comprise an outer end or other portion having a larger or smaller pore size when compared to an inner or another portion of the porous body. Likewise, the pores of the porous body may be larger or smaller at the outer periphery of the porous body than at a depth within the porous body, e.g., at a depth toward a central axis of the porous body. Still further, the changes in pore size may provide a functional gradient of changing pore size along a length and/or a depth of the porous body. Providing various pore sizes can allow adjustment of fluid flow at various locations of the porous body to enhance filter function.

Porous bodies can be formed from a wide variety of materials configured to perform a filtering function. In examples, porous bodies can comprise a porous plastic material although other materials may be employed. In example embodiments, the porous plastic material can comprise a porous polypropylene or polyethylene material.

The porous plastic material can be formed in a variety of ways. For example, a plurality of solid or porous polypropylene or polyethylene beads may be placed in a mold and exposed to a low level of heat and pressure to fuse portions of the beads to one another. Once fused, a porous body can be formed with the desired overall shape while providing an open-cell porous structure by way of interstitial spaces between the beads after the porous body is formed. The plastic porous bodies may be formed in a mold, pressed in flat plates and subsequently rolled into a tube or extruded in the desired shape. It is also possible to mix different ratios of beads with different bead diameters to obtain a desirable pore size. In one example, porous plastic material can comprise Porex Grade 1497 from Porex Porous Products Group of Porex Corporation located in Fairburn, Ga.

The porous body can comprise a wide variety of shapes. For instance, the porous body can be shaped in the form of a manifold arrangement having various shapes. In one example, the manifold arrangement can comprise a disk of porous material. In a further example, the manifold arrangement can comprise a plurality of arms extending from a central portion of the porous body. For instance, the manifold can comprise an arrangement set forth in U.S. Provisional Application No. 60/611,462 filed Sep. 20, 2004 although other manifold constructions may be employed in accordance with concepts of the present invention.

Figure 1:
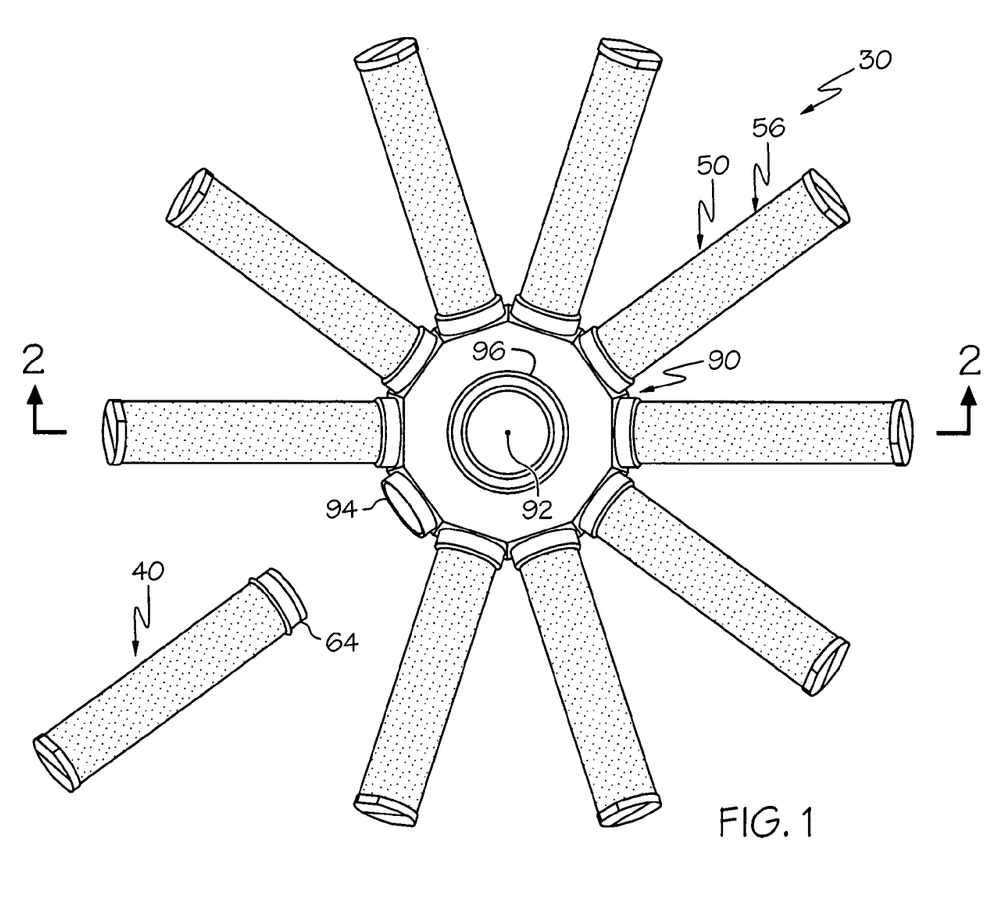
FIG. 1 is a top view of a filter device including a plurality of filter segments in accordance with one embodiment of the present invention.
Figure 2:
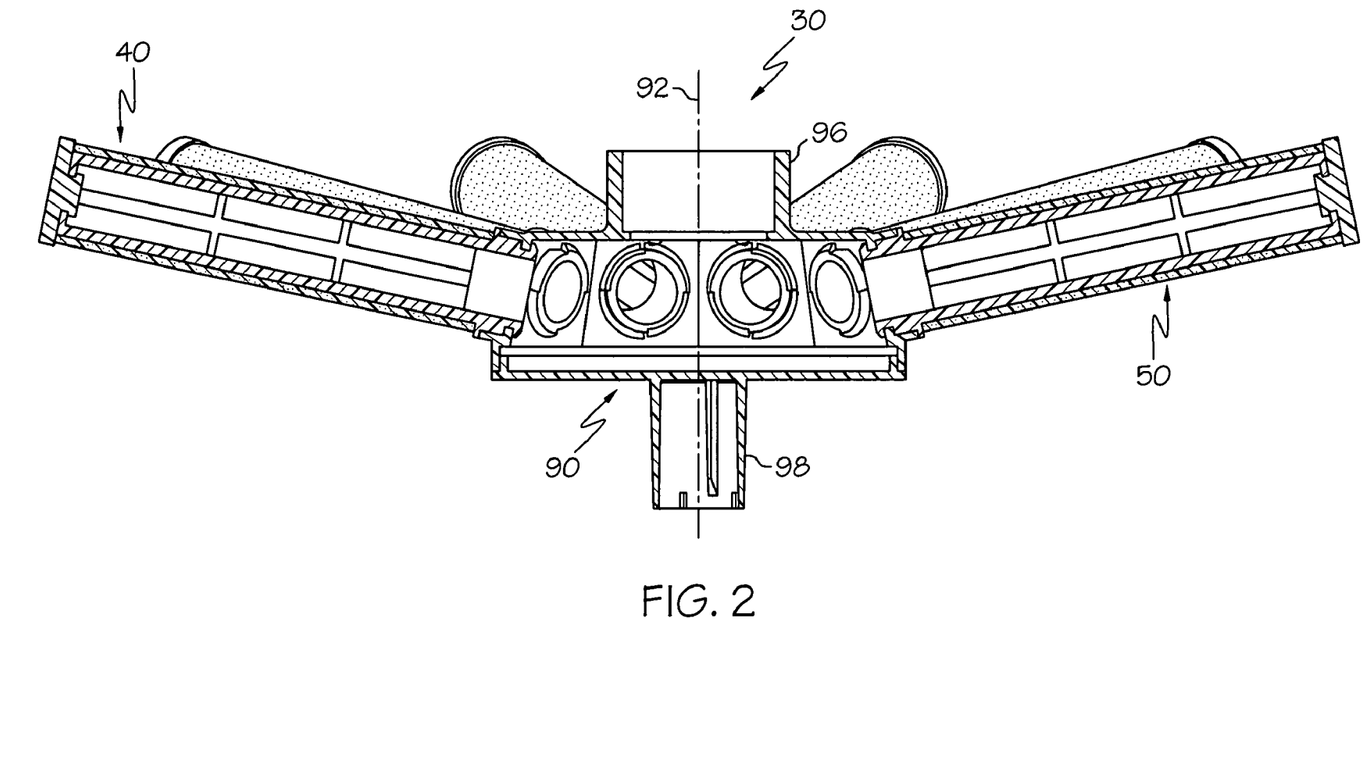
FIG. 2 is a sectional view of the filter device along line 2-2 of FIG. 1.

In examples of the fluid filter, a plurality of porous bodies may be used to increase the effective area for fluid intake. In certain examples, the plurality of porous bodies may be joined at a common base. For instance, as shown in FIGS. 1 and 2, the filter device 30 can comprise a base, such as the illustrated hub 90 with a plurality of porous bodies 50 configured to be attached to the hub 90 such that the plurality of porous bodies 50 are radially disposed about the hub 90. The porous bodies may be permanently attached to the hub, or as shown, removably attached to the hub.

One example of a hub 90 is illustrated in FIGS. 1 and 2. As shown, the hub 90 can comprise a plurality of sockets 94 configured to receive a corresponding end of a filter segment. The hub further includes a central coupling 96 configured to be attached to a fluid return conduit of a fluid filter apparatus. The hub 90 can further include a foot 98 extending from a lower surface to help support the hub 90 with respect to the bottom of a container of a fluid filter apparatus.

The plurality of porous bodies 50 can also be radially disposed about the hub 90 in a wide variety of ways. For instance, as shown in FIG. 1, the plurality of porous bodies 50 may be substantially equally radially disposed about a central axis 92 of the hub 90 in a hub-and-spoke pattern. Although not shown, the plurality of porous bodies may be nonequally radially disposed about the central axis to properly orient the porous bodies in the filtering environment. Moreover, the porous bodies 50 are illustrated as symmetrically disposed about the central axis 92. In further embodiments, the porous bodies may be asymmetrically disposed about the central axis.

The plurality of porous bodies may also be radially disposed at an angle with respect to the central axis of the hub. In one example, the porous bodies may each be disposed at a substantially 90° angle with respect to the central axis of the hub. As shown in FIG. 2, the porous bodies 50 are disposed at an upper acute angle with respect to the central axis 92. It is contemplated that the porous bodies may be disposed at other angles, for example, with an angle from about 0° to about 360° degrees, such as from about 0° to about 180°, with respect to the central axis 92. Moreover, although not shown, one or more of the porous bodies may be disposed at a different angle than one or more of the remaining porous bodies. In example arrangements, each porous body is disposed at a different angle with respect to the central axis. In further examples arrangements, staggered porous bodies may be disposed with corresponding upper and lower acute angles with respect to the central axis. In a further example, a first half of the plurality of porous bodies are substantially equally radially arranged about the hub at a first angle from about 0° to about 180° with respect to the central axis of the hub while a second half of the plurality of porous bodies are radially offset from the first half of elements at a second angle, different from the first angle, from about 0° to about 180° with respect to the central axis of the hub.

In further examples, the porous body may be formed with a cylindrical (e.g., circular cylindrical or noncircular cylindrical shape), a spherical shape or other shape. Still further, the porous body may comprise a substantially continuous porous body throughout the depth of the material or may have a hollow portion in the center to form a shell of porous material. In still further examples, the porous body may have reduced cross sectional shapes along the length of the porous body, e.g., perimeters that are simply larger or smaller versions of one another. In further examples, the porous body may have a substantially constant cross section along substantially the entire length of the porous element.

As shown in the illustrated embodiment, the porous body 50 can comprise a sleeve 52 having a hollow interior area 54. If provided as a sleeve, one or both of the ends of the sleeve can be open. In the illustrated embodiment both ends 52a, 52b of the sleeve are open. Providing the porous body 50 in the form of a sleeve can be beneficial to increase the outer surface area 56 of the porous body 50. Indeed, the length of the porous body and/or the diameter or other outer dimension of the porous body may be increased while providing relatively low resistance to fluid flow when compared to a non-hollow porous body with a substantially continuous porous body throughout the depth of the material. Moreover, providing the porous body as a sleeve can allow existing filter devices to be retrofitted to include the porous body including aspects of the present invention. For instance, the sleeve of the porous body may be inserted over an existing slotted lateral to prevent passage of sand through the slots and protect against sand passage due to damage of the lateral between slots of the existing lateral. At the same time, the existing lateral can act as a support structure for the sleeve to help maintain the sleeve shape.

Figure 3:
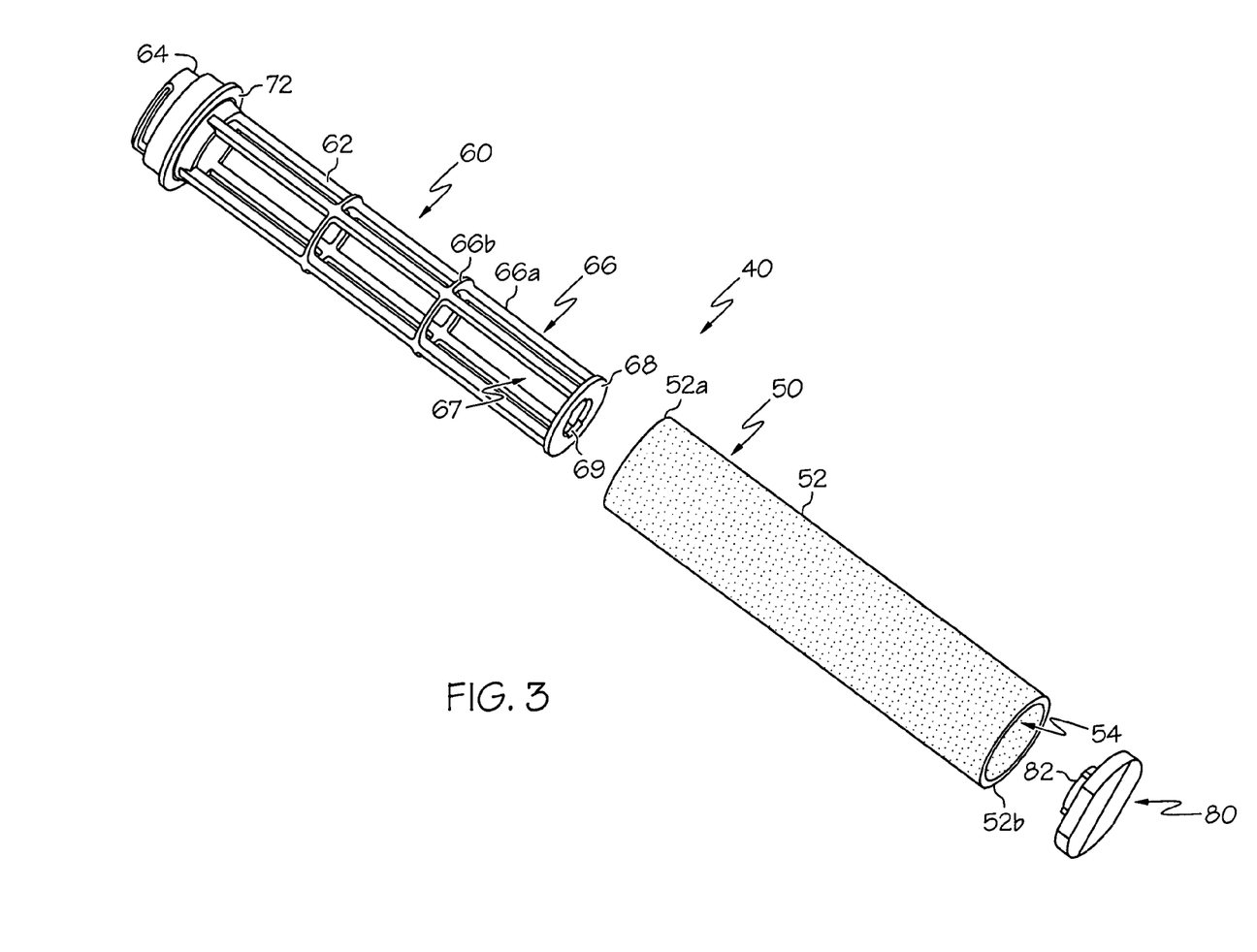
FIG. 3 is an exploded perspective view of a filter segment from the filter device of FIG. 1.
Figure 6:
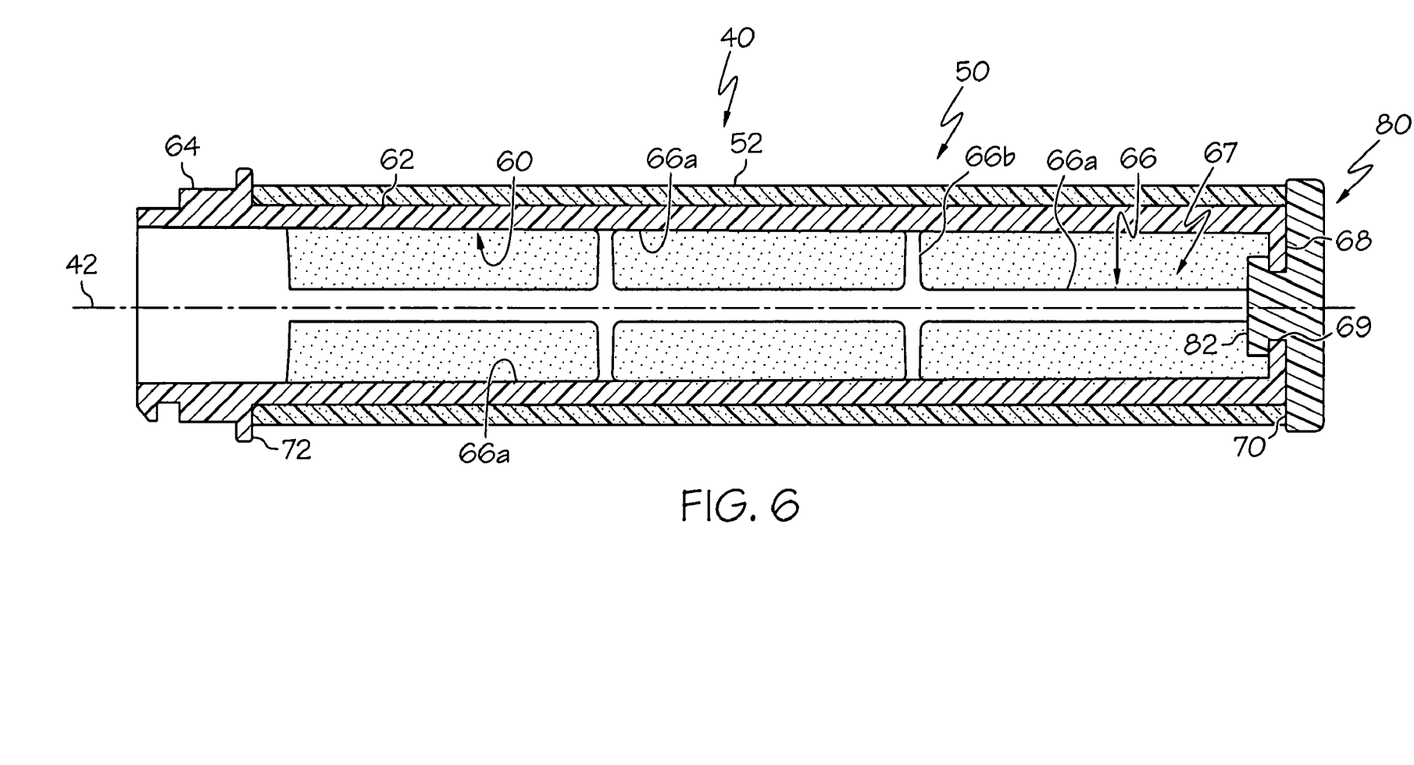
FIG. 6 is a sectional view of the filter segment along line 6-6 of FIG. 5.

As shown FIGS. 3 and 6, one example of the filter device can comprise a filter segment 40 including the porous body 50 and a support structure 60 for positioning at least partially within the hollow interior area 54 of the sleeve 52. In the illustrated embodiment, the support structure 60 comprises a frame 62 configured to facilitate maintenance of a sleeve shape. For example, when an under pressure is applied within the hollow interior area 54, the frame 62 follows the interior surface of the sleeve 52 defining the hollow interior area 54 to prevent the sleeve from collapsing under the pressure differential. The frame 62 can be configured to maximize interstitial areas 67 to maximize exposure of the interior area of the porous body 50 for use to draw filtered liquid into the hollow interior area 54 of the sleeve 52. The frame can comprise a single or a plurality of support elements. For example, a single support element may be arranged, such as helically arranged, to provide the desired support function. In the illustrated example, a support element 66 comprises a plurality of longitudinal support elements 66a although a single longitudinal support element might be used in further examples. Moreover, one or more lateral support elements 66b can also be provided to further enhance maintenance of the sleeve shape and/or to provide structural rigidity for embodiments including a plurality of longitudinal support elements.

Figure 4:
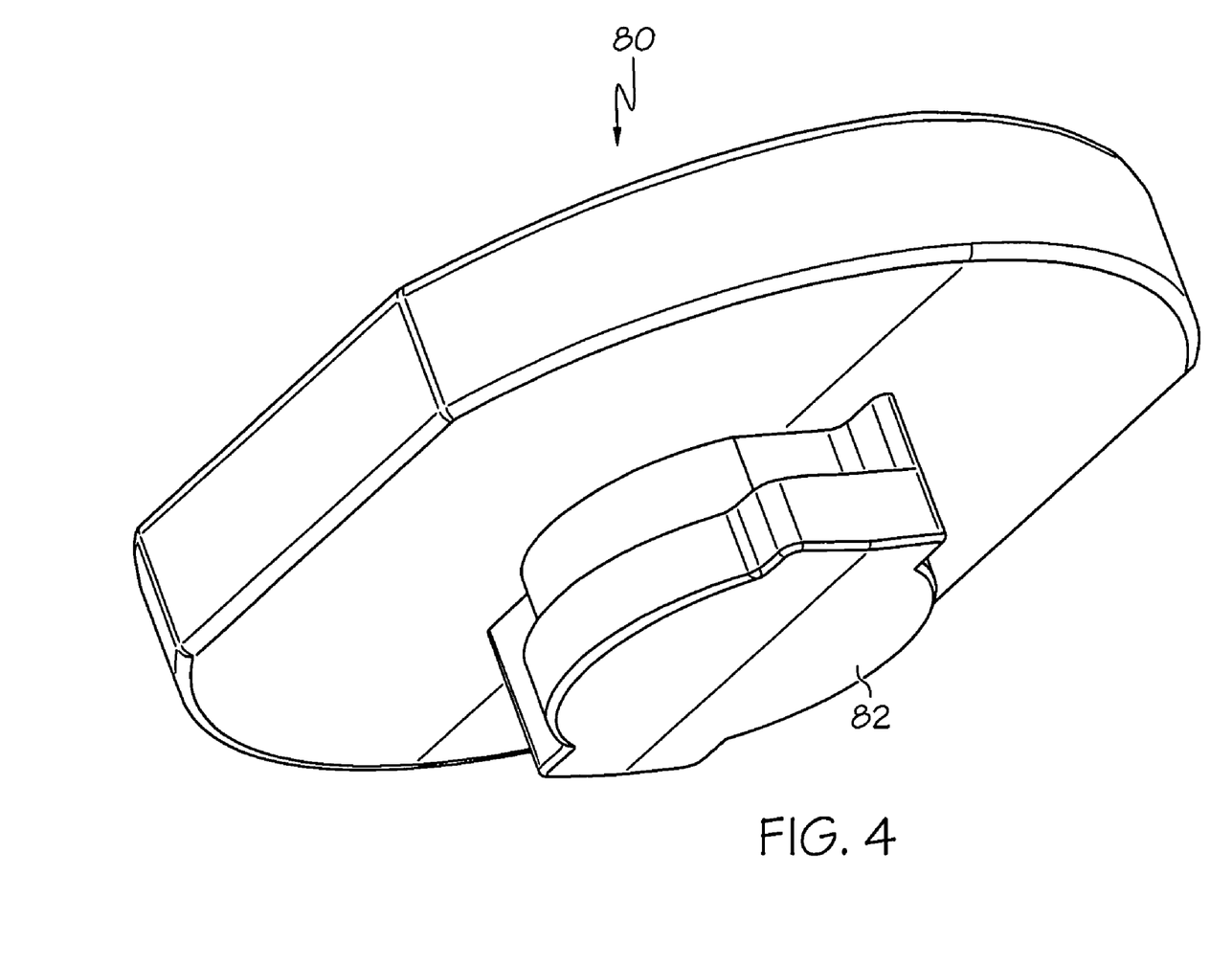
FIG. 4 is a perspective view of an end cap of a filter segment of FIG. 1.
Figure 5:
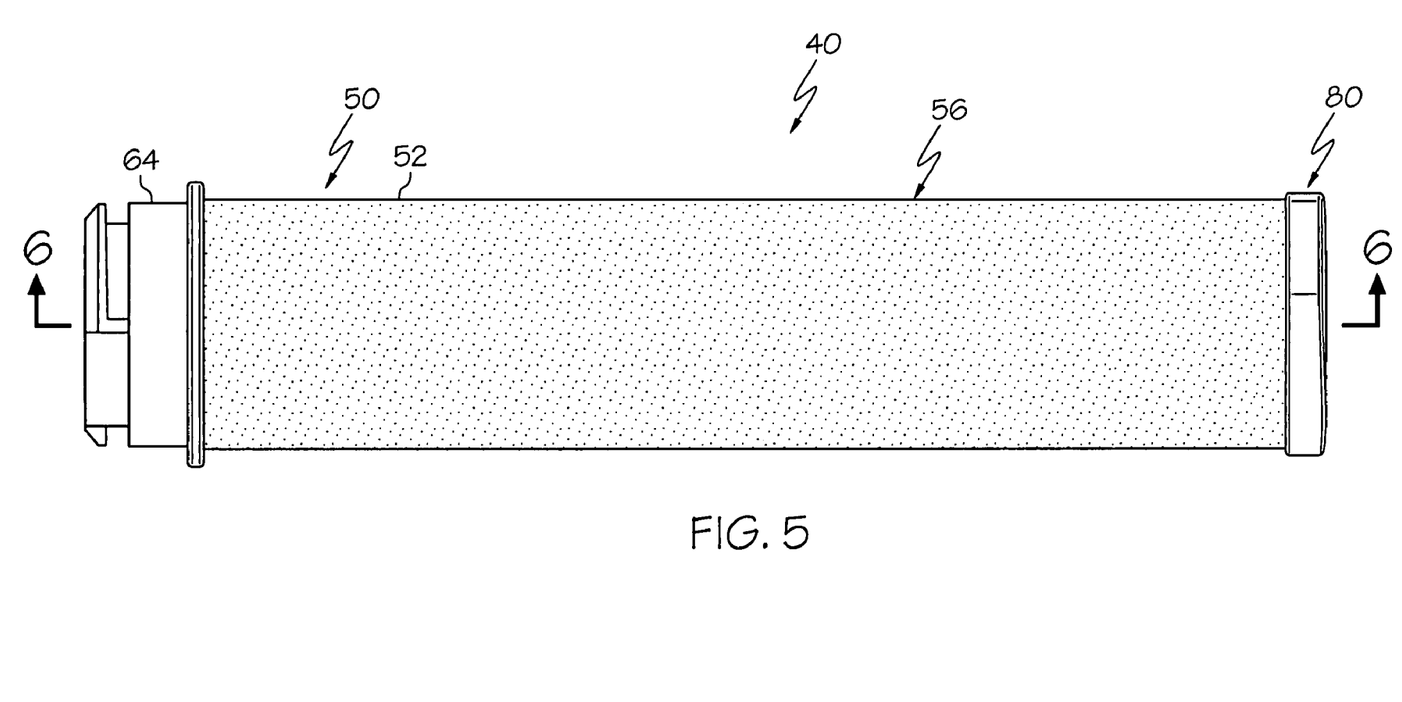
FIG. 5 is a side view of a filter segment of FIG. 1.

The filter device 30 can also include a retainment structure configured to maintain a position of the sleeve 52 with respect to the support structure 60. For example, FIG. 6 depicts the retainment structure including a first shoulder 70 configured to inhibit movement of the sleeve 52 from one end of the support structure 60. The retainment structure can further include a second shoulder 72 configured to inhibit movement of the sleeve 52 from the other end of the support structure 60. As shown, the first shoulder 70 may be provided by an end cap, such as the illustrated removable end cap 80. Providing a removable end cap can facilitate assembly of the filter segment 40. As shown in FIG. 4, the end cap can include a locking structure 82. The locking structure 82 is configured to be inserted in a corresponding locking hole 69 that may be provided in an end plate 68 of the support structure 60.

With reference to FIGS. 3 and 6, the filter segment 40 may be assembled by inserting the first open end 52a of the sleeve over the end plate 68 of the support structure 60. Next, the sleeve 52 is axially inserted over a portion of the support structure 60 until the open end 52a of the sleeve 52 abuts the second shoulder 72 of the support structure 60. Next, the locking structure 82 of the end cap 80 is inserted into the locking hole 69 of the end plate 68 such that the first and second shoulders 70, 72 are positioned to trap the sleeve 52 with respect to the frame 62. Next, the end cap 80 may be rotated about an axis 42 of the filter segment 40 to lock the end cap 80 to the support structure 60 and thereby trap the sleeve 52 on the frame 62 of the support structure 60. The end cap 80 may also be rotated in the opposite direction to release the end cap 80 from the support structure 60. Therefore, the illustrated end cap 80 is removably attached to the support structure 60 to permit selective removal of the sleeve 52 from the support structure 60. Subsequent removal of the sleeve 52 from the support structure 60 may be beneficial to allow replacement of a damaged sleeve or cleaning of a sleeve without removal of or disposal of the entire filter segment 40. In further embodiments, the end cap may be designed for permanent attachment to the support structure. In such examples, the entire filter segment may be disposable such that damage to the porous body may require replacement of the entire filter segment. Permanent end caps can be glued, sonic welded or integrally formed with the support structure. In further examples, the end cap may have an attachment structure that only allows attachment to the support structure and prevents subsequent removal of the end cap from the support structure.

The filter segment can also be configured to be removably attached to a base. As mentioned previously, the base may be provided as a hub 90 with a plurality of sockets 94 designed to receive an end of a corresponding filter segment 40. The end of the filter segment can be configured to be either removably or permanently attached to the socket of the hub. In the illustrated embodiment, for example, an end of the filter segment 40 can comprise a coupling 64 adapted to provide removable attachment to one of the sockets 94 of the hub 90. The coupling 64 may only be adapted to be received in one or a set of the sockets to provide different support elements at different radial locations around the hub 90. In the illustrated embodiment, the porous bodies 50 are each provided with an identical coupling 64 configured to be removably attached to any one of the sockets 94 of the hub 90. In order to attach the filter segment 40 to the hub 90, the coupling 64 can be inserted in one of the sockets 94 and rotated about the axis 42 of the filter segment 40 to attach the filter segment to the hub 90. As shown, the coupling 96 is formed on one end of the support structure 60. In further examples, the coupling can comprise an adapter configured to attach directly to the porous body. For instance, the adapter may have a socket with teeth adapted to grab an outer surface of the porous body to grasp the porous body and hold the porous body with respect to a base, such as a hub.

Figure 7:
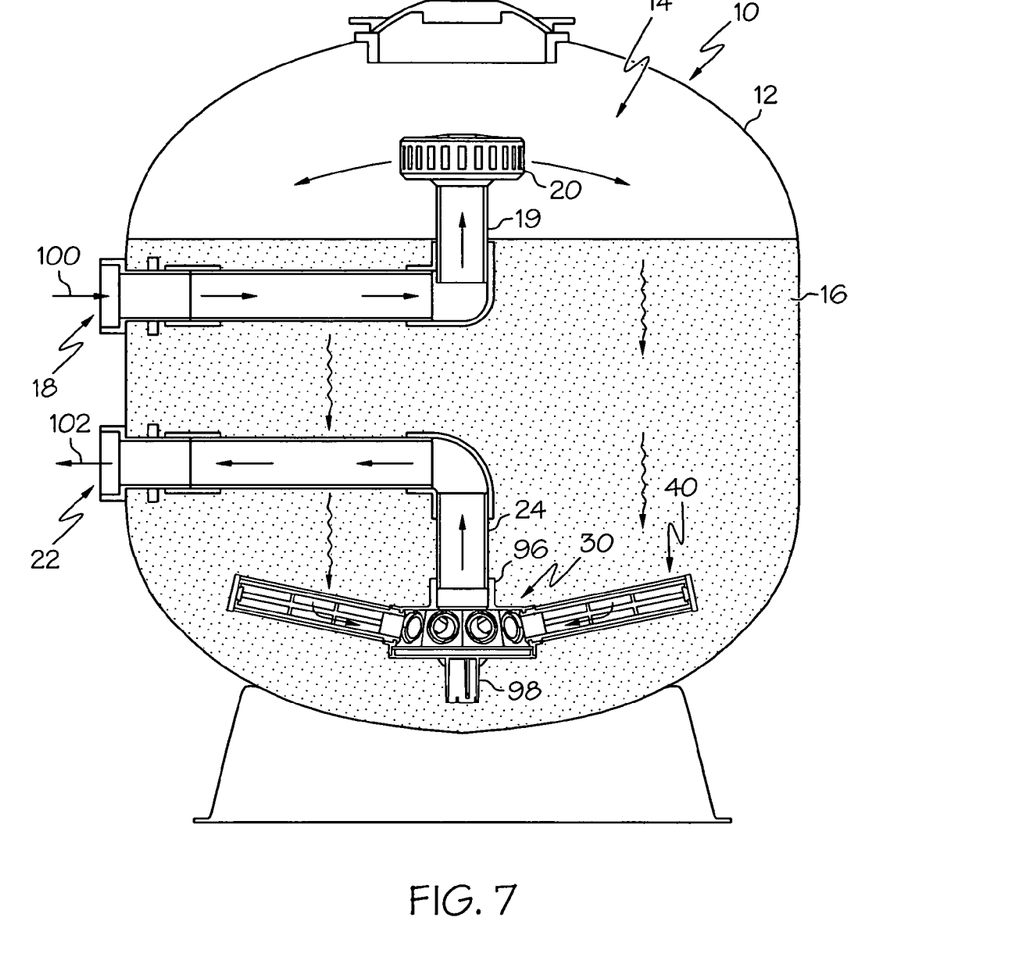
FIG. 7 is a partial sectional view of a fluid filter apparatus incorporating the filter device of FIG. 1.

As shown in FIG. 7, the filter device 30 can be incorporated as part of a fluid filter apparatus 10. The fluid filter apparatus 10 includes a container 12 defining an interior area 14. The filter device 30 is positioned within the interior area 14 and particulate 16 is positioned within the interior area 14 and covers the porous bodies 50 of the filter device 30. In examples of the fluid filter apparatus 10, the particulate 16 can comprise sand, zeolite, or a combination of sand and zeolite. Moreover, the particulate may include other materials adapted to purify, such as decontaminate, fluid being filtered through the particulate. Still further, various other materials may be used to provide particulate capable of performing a filtering function. The level of filtration of the debris can be related to the size of the particulate. For example, smaller particle sizes can offer a greater level of filtration. By using a filter device including a porous body, rather than conventional slotted laterals, smaller particulate may be used without prior concerns about the particulate passing through slots in the laterals. Accordingly, filter devices incorporation a porous body may be used with a fluid filter apparatus having a smaller grain size particulate to enhance filter function.

The porous body 50 can be effective for use in a fluid filter apparatus without particulate. In such an embodiment, the sole filtering function is carried out by the porous body. As illustrated in FIG. 7, the porous elements 50 can be used in combination with particulate to provide a filter with a fluid filter apparatus with a dual filtering function. Use of particulate in combination with the porous body can help delay loading of the porous body with debris. For example, during a first stage of filtration, relatively large debris is filtered by the particulate. During the second stage of filtration, relatively small debris may be filtered by the porous body. Therefore, required backwashing procedures may be minimized by using particulate in combination with the porous body.

As further illustrated in FIG. 7, a fluid return conduit 24 may be attached to the central coupling 96 of the hub 90 to provide fluid communication between a fluid outlet 22 and the filter segments 40. Furthermore, another conduit 19 may be arranged to provide fluid communication between a spray head 20 and a fluid inlet 18.

In operation, a fluid pump may be employed to cause circulation of fluid through the fluid filter apparatus 10. For example, the fluid filter apparatus 10 may be associated with a swimming pool with an unfiltered fluid stream 100 comprising unfiltered water from the swimming pool. The unfiltered fluid stream 100 passes through the conduit 19 and is disbursed by the spray head 20 within the interior area 14 of the container 12. The fluid stream then enters a first stage of filtration as the water passes through the particulate 16 wherein relatively large sized debris may be removed (e.g., debris having a maximum dimension from about 15 microns to about 25 microns). The filtered fluid stream then leaves the particulate and undergoes a second stage of filtration as it passes through the porous bodies 50 of the filter segments 40. During the second stage of filtration, even smaller debris may be removed (e.g., debris having a maximum dimension from about 2 microns to about 15 microns). The filtered fluid stream 102 then passes through the fluid return conduit, out the fluid outlet 22 and is then reintroduced into the swimming pool.

Accordingly, examples of the fluid filter apparatus can include a porous body 50 capable of inhibiting, such as preventing, particulate from leaking out of the filter. The porous body is further capable of performing a secondary filter function and permits passage of water through the porous body 50 at substantially every location about an outer surface area 56 of the porous body 50. Moreover, the porous material can help minimize disturbance of the particulate during a backwash procedure. For example, when performing a backwashing procedure, a reverse circulation is initiated wherein water is forced through the fluid outlet 22 to discharge previously filtered debris through the fluid inlet 18 for disposal. During the backwash procedure, the porous body helps disburse the fluid and therefore provides relatively less blasting and churning of particulate when compared to backwash procedures performed with a conventional slotted lateral. Moreover, the backwashing procedure can effectively clean portions of the porous body from debris.

From the above description of the invention, those skilled in the art will perceive improvements, changes and modifications. Such improvements, changes and modifications within the skill of the art are intended to be covered by the appended claims.

What is claimed:

1. A fluid filter apparatus that uses particulate to filter water in a pool or spa, the fluid filter apparatus comprising:
   a container defining an interior area;
   a hub positioned within the interior area;
   a lateral connected to and extending radially from the hub, the lateral including a frame, the frame having a plurality of longitudinal support elements and at least one lateral support element;
   a porous body including a sleeve disposed on the frame, the sleeve being constructed of an open-cell porous structure of fused beads that creates a tortuous path through a thickness of the porous body, the sleeve having a substantially cylindrical shape, the sleeve defining a hollow interior region, the plurality of longitudinal support elements being spaced apart about the at least one lateral support element in a shape complementary to the interior region, the frame extending into the interior region and engaging the sleeve within the interior region; and
   particulate disposed within the container and on the porous body.

2. The fluid filter apparatus of claim 1, wherein the particulate comprises sand.

3. The fluid filter apparatus of claim 1, wherein the particulate comprises zeolite.

4. The fluid filter apparatus of claim 1, wherein the porous body is configured to filter debris having a maximum outer dimension of less than 10 microns.

5. The fluid filter apparatus of claim 1, wherein the porous body is configured to filter debris having a maximum outer dimension of about 2 microns.

6. The fluid filter apparatus of claim 1, wherein the porous body is configured to filter debris having a maximum outer dimension from about 2 microns to less than 10 microns.

7. The fluid filter apparatus of claim 1, wherein the frame is configured to facilitate maintenance of the substantially cylindrical shape of the sleeve.

8. The fluid filter apparatus of claim 1, wherein the lateral includes a retainment structure configured to maintain a position of the sleeve with respect to the frame.

9. The fluid filter apparatus of claim 8, wherein the retainment structure includes:
   a shoulder member fixed to the frame proximate a first end of the sleeve, the shoulder member engaging the sleeve outside of the interior region;
   an end plate fixed to the frame and disposed within the interior region proximate a second end of the sleeve, the second end of the sleeve being opposite the first end; and
   an end cap attached to the end plate within the interior region, the end cap engaging the sleeve outside of the interior region, the end cap and the shoulder member inhibiting displacement of the sleeve in a direction along the longitudinal support elements of the frame.

10. The fluid filter apparatus of claim 9, wherein the end cap is removably attached to the end plate to permit selective removal of the sleeve from the frame.

11. The fluid apparatus of claim 1, wherein the lateral includes a base and a support structure configured to be removably attached to the base.

12. The fluid apparatus of claim 1, wherein the lateral comprises a plurality of laterals and the porous body comprises a plurality of porous bodies.

13. The fluid apparatus of claim 12, wherein the plurality of porous bodies are configured to be attached to the hub.

14. The fluid apparatus of claim 13, wherein the plurality of porous bodies are configured to be removably attached to the hub.

* * * * *